United States Patent
Wannenwetsch et al.

(10) Patent No.: US 7,783,878 B2
(45) Date of Patent: Aug. 24, 2010

(54) METHODS FOR DECOUPLING HARDWARE SETTINGS FROM SOFTWARE

(75) Inventors: Andreas Wannenwetsch, Dusseldorf (DE); Florian Eisser, Dusseldorf (DE); Jens Froehlich, Haan (DE)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 11/413,479

(22) Filed: Apr. 28, 2006

(65) Prior Publication Data

US 2007/0255939 A1    Nov. 1, 2007

(51) Int. Cl.
*G06F 1/24*    (2006.01)
(52) U.S. Cl. .......................... 713/100; 713/1; 717/170
(58) Field of Classification Search .............. 713/1, 713/100; 717/170
See application file for complete search history.

(56) References Cited

U.S. PATENT DOCUMENTS

| | | | | |
|---|---|---|---|---|
| 5,412,798 | A * | 5/1995 | Garney | 719/321 |
| 6,009,480 | A * | 12/1999 | Pleso | 710/8 |
| 6,483,746 | B2 * | 11/2002 | Haraguchi et al. | 365/185.08 |
| 6,581,157 | B1 * | 6/2003 | Chiles et al. | 713/1 |
| 6,898,653 | B2 | 5/2005 | Su et al. | |
| 7,117,482 | B2 * | 10/2006 | Nguyen et al. | 717/122 |
| 7,237,101 | B1 * | 6/2007 | Dono et al. | 713/1 |
| 2002/0052982 | A1 | 5/2002 | Kubota | |
| 2003/0135663 | A1 * | 7/2003 | Duncan et al. | 709/321 |
| 2006/0244986 | A1 * | 11/2006 | Ferlitsch | 358/1.13 |
| 2007/0214344 | A1 * | 9/2007 | Helvick | 713/1 |

FOREIGN PATENT DOCUMENTS

| | | |
|---|---|---|
| EP | 1 603 036 | 12/2005 |
| WO | WO 01/97025 | 12/2001 |

OTHER PUBLICATIONS

The International Search Report for PCT Application No. PCT/IB2007/001000; Filed Apr. 17, 2007; Date of Completion Sep. 26, 2007; Date of Mailing Sep. 28, 2007.

The Written Opinion for PCT Application No. PCT/IB2007/001000; Filed Apr. 17, 2007; Date of Completion Sep. 26, 2007; Date of Mailing Sep. 28, 2007.

* cited by examiner

*Primary Examiner*—Chun Cao
(74) *Attorney, Agent, or Firm*—Alston & Bird LLP

(57) ABSTRACT

A device for decoupling hardware settings from software includes a hardware unit and a software module. The hardware unit has a processing element and a memory. The software module is capable of providing hardware settings for configuration of the hardware unit. The software module includes built-in instructions capable of including at least a portion of the hardware settings. The memory of the hardware device stores hardware controlled hardware settings for facilitating configuration of the hardware unit.

25 Claims, 5 Drawing Sheets

METHODS FOR DECOUPLING HARDWARE SETTINGS FROM SOFTWARE

FIELD OF THE INVENTION

Embodiments of the present invention relate generally to hardware settings of electronic devices and, more particularly, relate to methods, a device, a mobile terminal and a computer program product for decoupling hardware settings from software in electronic devices, and particularly in telecommunication network devices such as mobile terminals.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, hardware and software improvements for electronic communications devices are continually released. Hardware includes the physical components of the electronic communications devices, and requires software including written instruction codes providing hardware settings that configure the electronic communications devices, to function as required in a communication network. It is currently typical for hardware and software enhancements to be delivered together, since a new hardware release typically requires a new software release at the same time. Thus, hardware and software are highly coupled such that hardware release dates are aligned to the release cycle of software, which is typically about a one year cycle. Accordingly, there are limitations on the ability of a manufacturer to release new hardware. However, certain conditions may arise for which it may be advantageous to release new hardware independent of the software release cycle such as, for example, bug fixes, replacement of end-of-life components, cost optimization, etc.

An example of the problem described above may apply to situations where a hardware improvement for existing hardware is desired. For example, if a new hardware release for an existing Plesiochronous Digital Hierarchy (PDH) interface unit for a transmission node is developed, the old software, which normally includes information providing the data for hardware configuration and the means for hardware configuration, may not be able to configure the new hardware. Accordingly, there is a gap between the old software and the new hardware that prevents proper configuration of the new hardware. For this reason, the new hardware would typically not be released until compatible software is developed, thereby limiting expansion or improvement of the existing system until a release date of the compatible software.

Given the above described problems, there is an existing need to decouple hardware settings from software, in order to increase flexibility for hardware release dates and improve the ability to expand wireless and mobile networking technologies.

BRIEF SUMMARY OF THE INVENTION

Methods, devices, and computer program products are therefore provided that decouples hardware settings from software. Thus, hardware improvements may be made independent of software release dates. Accordingly, efficiency and performance of networks may be enhanced independent of software release dates.

In one exemplary embodiment, methods and computer program products for determining whether to configure a hardware unit using one or more of hardware controlled hardware settings and built-in settings of a device driver are provided. The methods and computer program products include obtaining the built-in settings of the device driver, obtaining the hardware controlled hardware settings from a memory device of the hardware unit, comparing a version associated with the built-in settings to a version associated with the hardware controlled hardware settings for portions of hardware controlled hardware settings that correspond to portions of the built-in settings, and configuring the hardware unit responsive to the comparison.

In another exemplary embodiment, a method of decoupling hardware settings from software is provided. The method includes installing hardware controlled hardware settings into a memory of a hardware unit, determining whether to configure the hardware unit using one or more of the hardware controlled hardware settings and built-in settings of a device driver, and configuring the hardware unit responsive to the determination.

In another exemplary embodiment, a device for providing decoupling of hardware settings from software is provided. The device includes a hardware unit and a software module. The hardware unit has a processing element and a memory. The software module is capable of providing hardware settings for configuration of the hardware unit. The software module includes built-in instructions capable of including at least a portion of the hardware settings. The memory of the hardware device stores hardware controlled hardware settings for facilitating configuration of the hardware unit.

In another exemplary embodiment, a mobile terminal for providing decoupling of hardware settings from software is provided. The mobile terminal includes a hardware unit and a software module. The hardware unit has a processing element and a memory. The software module is capable of providing hardware settings for configuration of the hardware unit. The software module includes built-in instructions capable of including at least a portion of the hardware settings. The memory of the hardware device stores hardware controlled hardware settings for facilitating configuration of the hardware unit.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
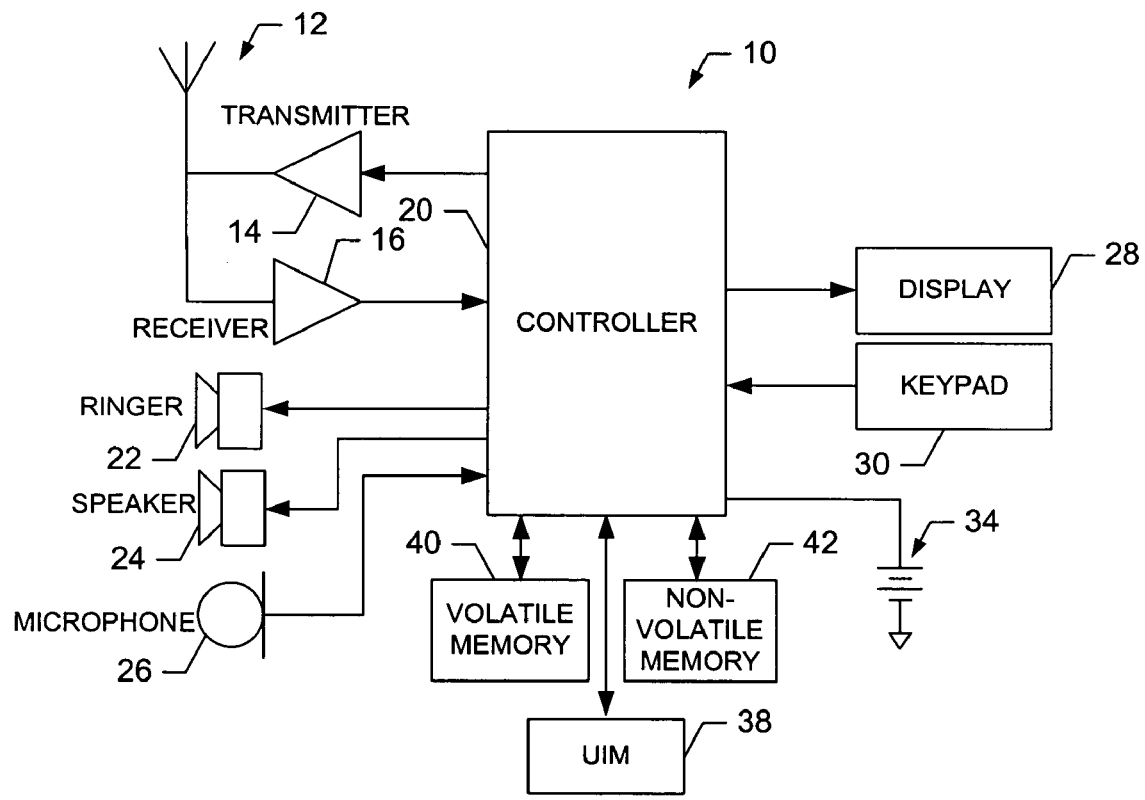
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention.

Figure 2:
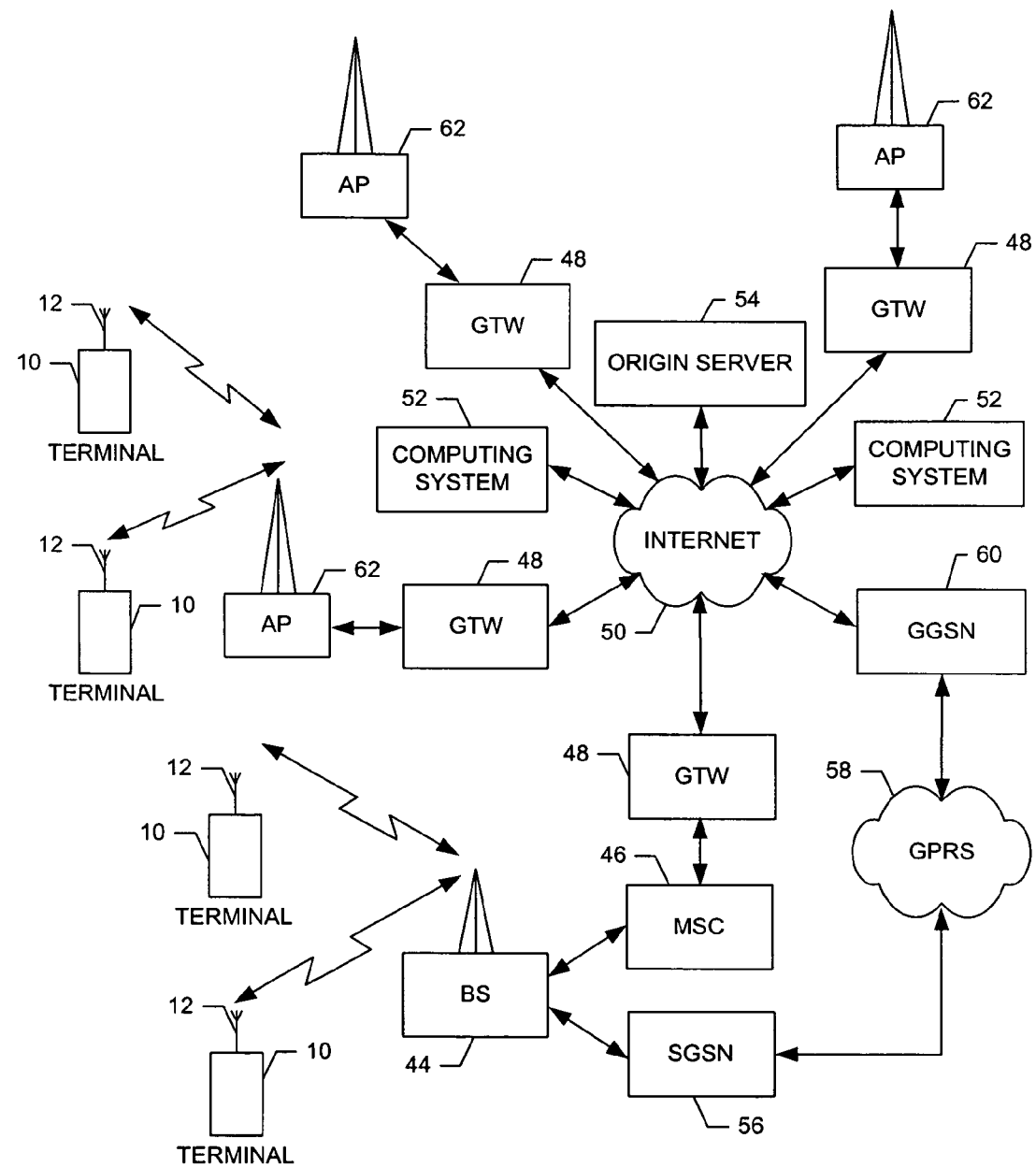
FIG. 2 is a schematic block diagram of a wireless communications system according to an exemplary embodiment of the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries. For example, network devices as shown in FIG. 2 and described below, or indeed, any electronic device involving hardware and software elements would similarly benefit from the present invention. Accordingly, the present invention should not be construed as being limited to applications in the mobile communications industry.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Referring now to FIG. 2, an illustration of one type of system that would benefit from the present invention is provided. The system includes a plurality of network devices, any of which may employ embodiments of the present invention. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of a system for decoupling hardware settings from software are displayed. The system of FIG. 3 may be employed, for example, on the mobile terminal 10 of FIG. 1 or the network devices of FIG. 2. However, it should be noted that the system of FIG. 3, may also be employed on a variety of other devices, both mobile and fixed, and therefore, the present invention should not be limited to application on devices such as the mobile terminal 10 of FIG. 1 or the network devices of FIG. 2.

Figure 3:
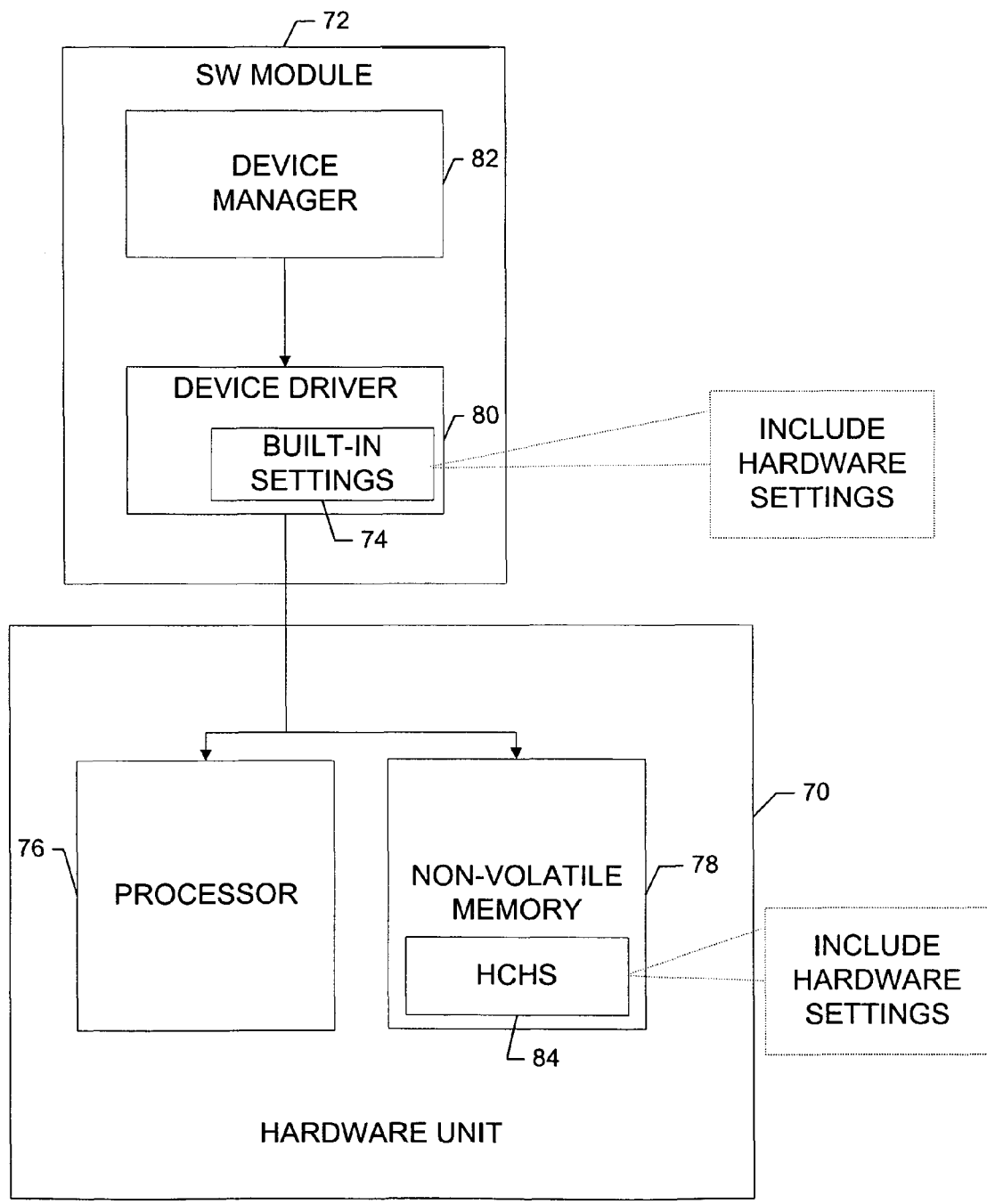
FIG. 3 illustrates a block diagram showing a unit capable of decoupling of hardware settings from software according to an exemplary embodiment of the present invention.

Referring now to FIG. 3, a system for decoupling hardware settings from software is provided. The system includes a hardware unit 70 and a software module 72. In this exemplary embodiment, it is assumed that the hardware unit 70 replaces a previously existing hardware unit and the software module 72 includes both the necessary instructions to permit configuration of the previously existing hardware unit and the data for configuration of the previously existing hardware unit. Generally speaking, the necessary instructions and the data for configuration provide hardware settings to a hardware device that enable the hardware device to function properly. The hardware settings are at least partially provided by built-in settings 74 of the software module 72.

The hardware unit 70 may be any hardware device that comprises at least a processing element or controller 76 and a non-volatile memory 78. In an exemplary embodiment, the hardware unit 70 comprises the controller 76 and non-volatile memory 78 such as a flash memory disposed on either a single printed circuit board (PCB) or multiple PCBs. The software module 72 may include any software embodied in computer readable code that is capable of configuring a hardware unit.

In an exemplary embodiment, the software module 72 includes a device driver 80 and a device manager 82, which controls the device driver 80. The device driver 80 is typically capable of accessing all configuration data and hardware settings needed to configure the previously existing hardware unit. In other words, the device driver 80 typically has both the means and the data for configuring the previously existing hardware unit. As stated above, the hardware settings are typically included in the built-in settings 74, which are accessible to the device driver 80. However, when the hardware unit 70 is installed, the device driver 80 may not be able to employ the built-in settings 74 to configure the hardware unit 70 since the built-in settings 74 may only be compatible with the previously existing hardware unit. In other words, there may be a compatibility gap between the device driver 80 and the hardware unit 70, thereby preventing configuration of the hardware unit 70. In order to bridge the compatibility gap between the device driver 80 and the hardware unit 70, the hardware unit 70 may include hardware controlled hardware settings (HCHS) 84 stored in the non-volatile memory 78.

The HCHS 84 are stored in the non-volatile memory 78 of the hardware unit 70 and therefore, are an inherent feature of the hardware unit 70. The HCHS 84 may include a portion of the data and means for configuring the hardware unit 70, or alternatively, the HCHS 84 may include all of the data and means for configuring the hardware unit 70. For example, the means for configuring the hardware unit 70 may include instructions the device driver 80 employs for configuring the hardware unit 70. However, in an exemplary embodiment, the HCHS 84 include at least a portion of the data and/or means for configuring the hardware unit 70 sufficient to bridge the compatibility gap between the device driver 80 and the hardware unit 70. Accordingly, in operation, when the device driver 80 attempts to configure the hardware unit 70, the device driver 80 may obtain specific hardware settings to supplement or replace the built-in settings 74 from the HCHS 84. Thus, in an exemplary embodiment, some portions of the hardware settings may be obtained from the HCHS 84 while remaining portions of the hardware settings are obtained from the built-in settings 74 or, alternatively, all of the hardware settings may be obtained from the HCHS 84.

Since the HCHS 84 are an inherent feature of the hardware unit 70, there need not be any means to update the HCHS 84. Thus, for example, a software upgrade is not capable of updating or changing the HCHS 84. However, it may be advantageous to have the HCHS 84 superseded if, for example, faults are discovered in the HCHS 84. Accordingly, a versioning mechanism may be employed to enable the device driver to select an appropriate source for the hardware settings for configuring the hardware unit 70. In the versioning mechanism, which is described in greater detail below in reference to FIG. 4, the HCHS 84 are provided with a fixed version number upon loading the HCHS 84 into the non-volatile memory 78. Likewise, the built-in settings 74 are provided with a version number. The version number of the built-in settings 74 may then be compared to the fixed version number of the HCHS 84 to determine which settings (i.e., the built-in settings 74 or the HCHS 84) should be used for configuration of the hardware unit 70. Generally speaking, settings corresponding to the highest version number are the settings that will be selected for use in configuration of the hardware unit as the highest version number generally indicates a more current version. However, since the HCHS 84 may only cover a portion of all the hardware settings needed to configure the hardware unit 70, it is possible that a portion of the hardware settings which the device manager uses for configuration will be selected from the HCHS 84 having a higher fixed version number than the version number of the built-in settings 74, while remaining portions of the hardware settings are selected from the built-in settings 74 regardless of the version number. In other words, the higher fixed version number HCHS 84 only supersedes corresponding relevant portions from the built-in settings 74.

It should be noted that although the description above refers to version numbers being used to select which portions of hardware settings will be used for configuration of the hardware unit 70, any other means for determining a more recent version of respective settings may also be used. Accordingly, a comparison of version numbers to determine a higher version number is merely one example of a versioning mechanism that may be employed in embodiments of the present invention and other exemplary means may also be employed. For example, a date associated with each version may be compared.

Figure 4:
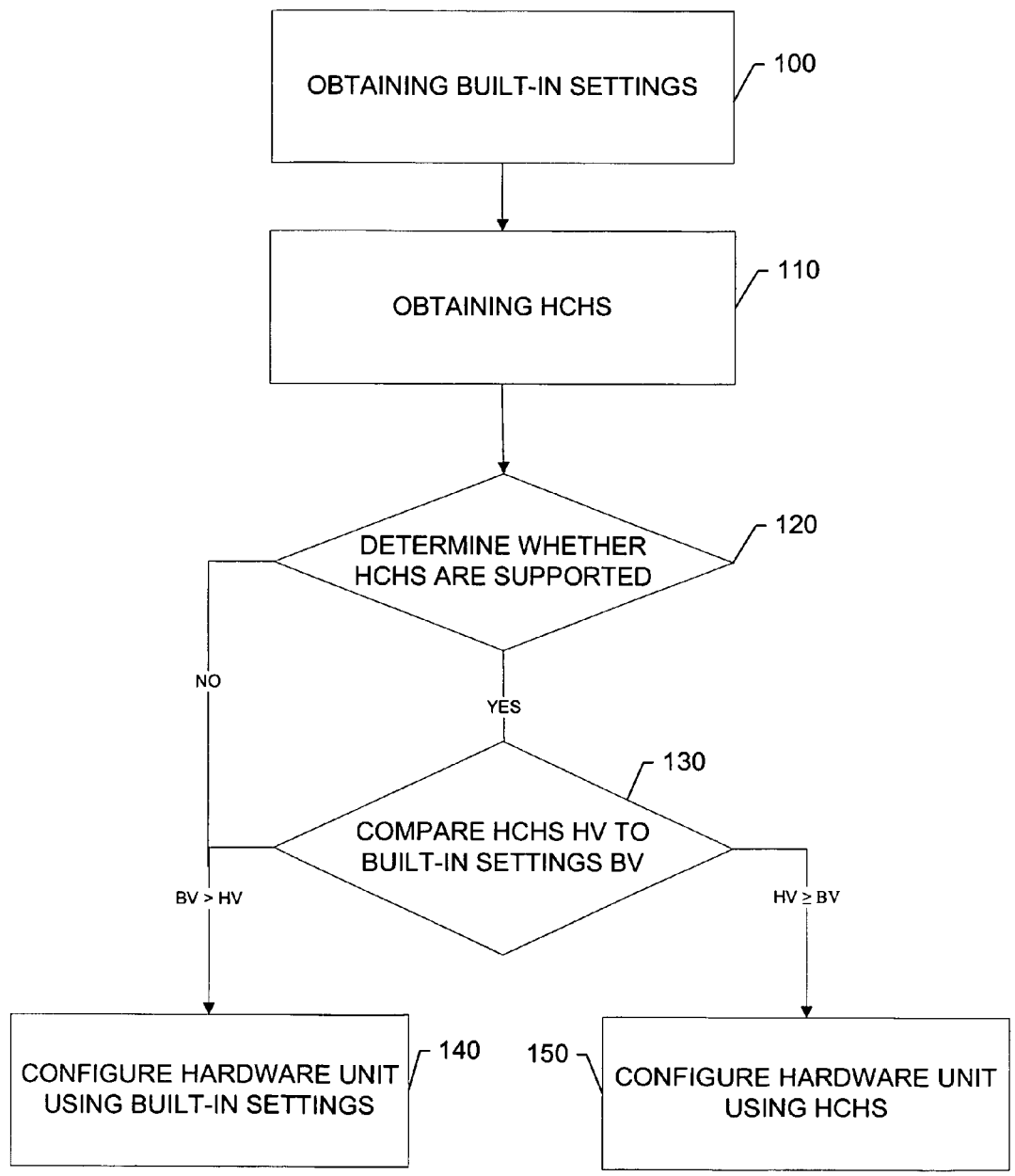
FIG. 4 is a flowchart according to an exemplary method of selecting a source for hardware settings capable of decoupling of hardware settings from software according to an exemplary embodiment of the present invention.

FIG. 4 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for selecting a source for hardware settings to decouple hardware settings from software includes obtaining device driver built-in settings at operation 100. The built-in settings are assumed to have a version number "BV", although any versioning mechanism may be employed. At operation 110, HCHS are obtained. The HCHS are assumed to have a fixed version number "HV", although any versioning mechanism may be employed. At operation 120, a determination is made as to whether HCHS are supported. If the HCHS are not supported, then the hardware unit is configured using the built-in settings at operation 140. If the HCHS are supported, then the HV and BV are compared to determine which settings to use at operation 130. If the BV is higher than the HV, then the hardware unit is configured based on the built-in settings at operation 140. If the BV is less than or equal to the HV, then the hardware unit is configured based on the HCHS at operation 150. Thus, generally speaking, FIG. 4 represents an exemplary method of employing the versioning mechanism discussed above. However, it should be noted that other mechanisms may also be employed.

It should be noted that, according to an exemplary embodiment, the method described above may be employed only when new hardware is detected by the device driver 80. Alternatively, however, the method described above may be employed at regular intervals, or whenever the mobile terminal 10 or any other device employing embodiments of the present invention is powered up. Additionally, a comparison of version numbers may often lead to a situation in which, as described above, a portion of the HCHS overlap with a portion of the built-in settings, while another portion of the HCHS do not overlap with the built-in settings. In other words, a portion of the HCHS may correspond with a portion of the built-in settings such that either one or the other but not both of those portions may be employed to configure the hardware unit 70, while other portions of either or both of the HCHS and the built-in settings do not correspond with each other. In such a situation, those portions of both the HCHS and the built-in settings that do not overlap are each employed by the device driver 80 for use in configuring the hardware unit 70, while the portions that do correspond to each other, or overlap, must be compared to determine which version is more recent and should therefore be employed to configure the hardware unit 70.

Figure 5:
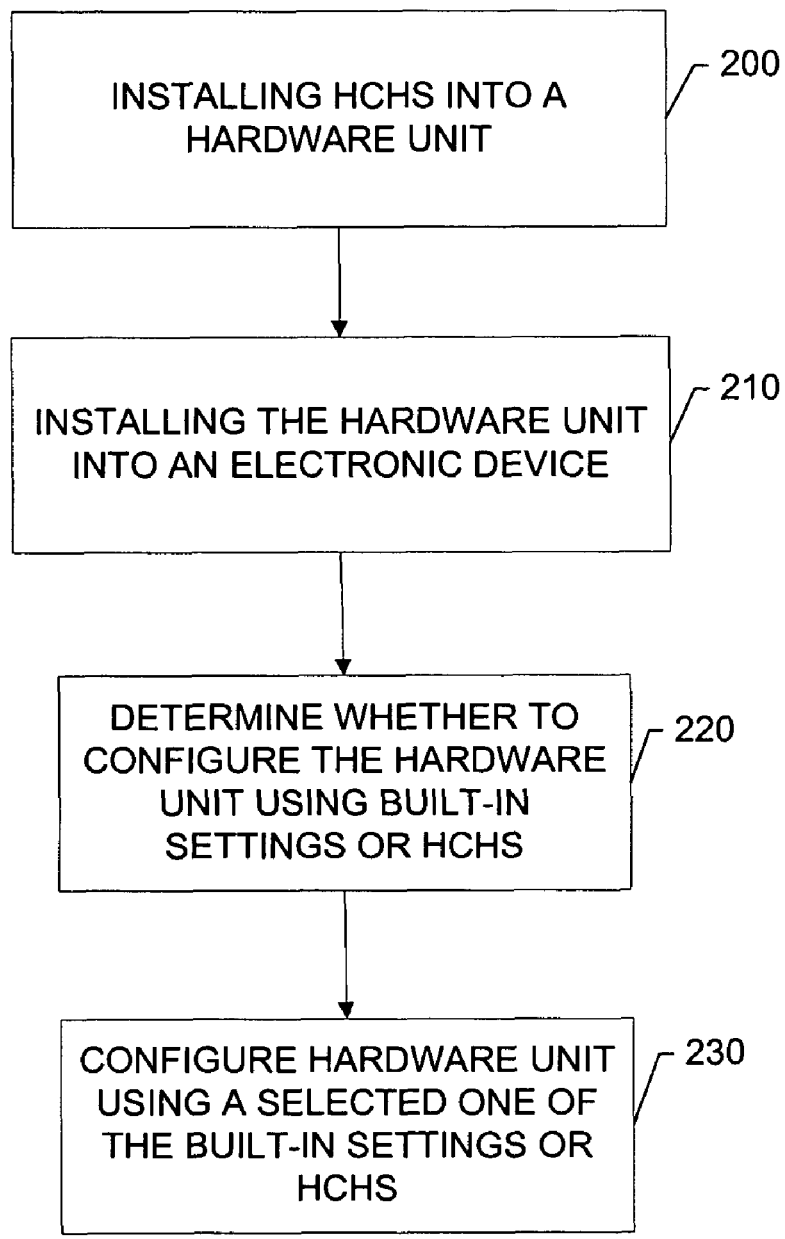
FIG. 5 is a flowchart according to an exemplary method of decoupling of hardware settings from software according to an exemplary embodiment of the present invention.

FIG. 5 is a flowchart illustrating a method for decoupling hardware settings from software. The method includes installing hardware controlled hardware settings into a hardware unit at operation 200. At operation 210, a hardware unit having the hardware controlled hardware settings stored therein is installed in an electronic device. At operation 220, a device driver of the electronic device determines whether to configure the hardware unit with built-in settings or the hardware controlled hardware settings, such as in accordance with the method of FIG. 4. At operation 230, the hardware unit is configured using a selected one of the built-in settings or the hardware controlled hardware settings.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining whether to configure a hardware unit using one or more of hardware controlled hardware settings and built-in settings of a device driver of an original hardware unit replaced by the hardware unit, the built-in settings configuring the original hardware unit, the hardware unit having locally installed hardware controlled hardware settings in a memory of the hardware unit, the hardware controlled hardware settings being configured to bridge a compatibility gap between the built in settings and the hardware unit with respect to configuring the hardware unit; and
   configuring the hardware unit responsive to the determination.

2. A method according to claim 1, wherein the determining comprises comparing a version of the hardware controlled hardware settings to a version of the built-in settings.

3. A method according to claim 1, wherein the determining comprises determining whether hardware controlled hardware settings are supported.

4. A method comprising:
   obtaining the built-in settings of a device driver of an original hardware unit being replaced by a hardware unit, the built-in settings being used to configure the original hardware unit;
   obtaining hardware controlled hardware settings from a memory device of the hardware unit configurable by the device driver based on the hardware controlled hardware settings or the built-in settings, the hardware controlled hardware settings defining at least a portion of data for configuration of the hardware unit stored locally at the hardware unit, the hardware controlled hardware settings being configured to bridge a compatibility gap between the built in settings and the hardware unit with respect to configuring the hardware unit;

comparing a version associated with the built-in settings to a version associated with the hardware controlled hardware settings for portions of hardware controlled hardware settings that correspond to portions of the built-in settings; and configuring the hardware unit responsive to the comparison.

5. A method according to claim 4, wherein, if at least one portion of the built-in settings and the hardware controlled hardware settings correspond, configuring comprises:

selecting one of the corresponding portions of the built-in settings or the corresponding portions of the hardware controlled hardware settings based on the comparison of the version associated with the built-in settings to the version associated with the hardware controlled hardware settings.

6. A method according to claim 5, wherein selecting comprises:

selecting the built-in settings if the version associated with the built-in settings is more recent than the version associated with the hardware controlled hardware settings; and selecting the hardware controlled hardware settings if the version associated with the hardware controlled hardware settings is more recent than the version associated with the built-in settings.

7. A method according to claim 5, further comprising selecting the built-in settings for portions of the built-in settings that do not correspond to portions of the hardware controlled hardware settings and selecting the hardware controlled hardware settings for portions of the hardware controlled hardware settings that do not correspond to portions of the built-in settings.

8. A method according to claim 4, further comprising selecting the built-in settings if the hardware controlled hardware settings are not supported.

9. A computer program product comprising at least one computer-readable storage medium having computer-readable program code portions stored therein, the computer-readable program code portions comprising:

a first executable portion for obtaining the built-in settings of a device driver of an original hardware unit being replaced by a hardware unit, the built-in settings being used to configure the original hardware unit;

a second executable portion for obtaining hardware controlled hardware settings from a memory device of the hardware unit configurable by the device driver based on the hardware controlled hardware settings or the built-in settings, the hardware controlled hardware settings defining at least a portion of data for configuration of the hardware unit stored locally at the hardware unit, the hardware controlled hardware settings being configured to bridge a compatibility gap between the built in settings and the hardware unit with respect to configuring the hardware unit;

a third executable portion for comparing a version associated with the built-in settings to a version associated with the hardware controlled hardware settings for portions of hardware controlled hardware settings that correspond to portions of the built-in settings; and a fourth executable portion for configuring the hardware unit responsive to the comparison.

10. A computer program product according to claim 9, wherein, if at least one portion of the built-in settings and the hardware controlled hardware settings correspond, the fourth executable portion includes instructions for:

selecting one of the corresponding portions of the built-in settings or the corresponding portions of the hardware controlled hardware settings based on the comparison of the version associated with the built-in settings to the version associated with the hardware controlled hardware settings; and selecting the built-in settings for portions of the built-in settings that do not correspond to portions of the hardware controlled hardware settings and selecting the hardware controlled hardware settings for portions of the hardware controlled hardware settings that do not correspond to portions of the built-in settings.

11. A computer program product according to claim 9, wherein the fourth executable portion includes instructions for:

selecting the built-in settings if the version associated with the built-in settings is more recent than the version associated with the hardware controlled hardware settings; and selecting the hardware controlled hardware settings if the version associated with the hardware controlled hardware settings is more recent than the version associated with the built-in settings.

12. A computer program product according to claim 9, further comprising selecting the built-in settings if the hardware controlled hardware settings are not supported.

13. An apparatus comprising a processor and memory including computer program code, the memory and computer program code configured to, with the processor, cause the apparatus to at least control:

a device manager configured to provide hardware settings for configuration of a hardware unit replacing an original hardware unit configured via built in instructions, the hardware unit having memory, the device manager being further configured to access the built-in instructions capable of including at least a portion of the hardware settings, wherein the memory of the hardware unit is configured to store hardware controlled hardware settings for facilitating configuration of the hardware unit, the hardware controlled hardware settings configured to define at least a portion of data for configuration of the hardware unit stored locally at the hardware unit, the hardware controlled hardware settings being configured to bridge a compatibility gap between the built in settings and the hardware unit with respect to configuring the hardware unit.

14. An apparatus according to claim 13, wherein the device manager is configured to make a determination whether to configure the hardware unit using one or more of the hardware controlled hardware settings and the built-in settings.

15. An apparatus according to claim 14, wherein the determination is made responsive to comparison of respective versions associated with the hardware controlled hardware settings and the built-in settings.

16. An apparatus according to claim 13, wherein the hardware controlled hardware settings include a portion of the hardware settings.

17. An apparatus according to claim 16, wherein the built-in settings supersede corresponding hardware controlled hardware settings.

18. An apparatus according to claim 13, wherein the hardware controlled hardware settings include all of the hardware settings.

19. An apparatus according to claim 13, wherein the hardware unit replaces a pre-existing hardware unit.

20. An apparatus according to claim 13, wherein the hardware controlled hardware settings include instructions for configuration of the hardware unit.

21. An apparatus according to claim 13, wherein the apparatus is a mobile terminal.

22. An apparatus according to claim 13, wherein the device manager is configured to determining whether to configure the hardware unit using one or more of the hardware controlled hardware settings and built-in settings of the device driver based on selecting between a first option including using selected portions of the built-in settings and hardware controlled hardware settings and a second option including replacement of the built-in settings with the hardware controlled hardware settings.

23. A method according to claim 1, wherein determining whether to configure the hardware unit using one or more of the hardware controlled hardware settings and built-in settings of the device driver comprises selecting between a first option including using selected portions of the built-in settings and hardware controlled hardware settings and a second option including replacement of the built-in settings with the hardware controlled hardware settings.

24. A method according to claim 4, wherein configuring the hardware unit responsive to the comparison comprises selecting between a first option including using selected portions of the built-in settings and hardware controlled hardware settings and a second option including replacement of the built-in settings with the hardware controlled hardware settings.

25. A computer program product according to claim 9, wherein the fourth executable portion includes instructions for selecting between a first option including using selected portions of the built-in settings and hardware controlled hardware settings and a second option including replacement of the built-in settings with the hardware controlled hardware settings.

* * * * *